United States Patent

Lee

Patent Number: 5,847,511
Date of Patent: Dec. 8, 1998

[54] AUTOMATIC IMAGE ROTATION COMPENSATION CIRCUIT AND METHOD

[75] Inventor: Joo-Hyoung Lee, Suwon-si, Rep. of Korea

[73] Assignee: SamSung Electronics Co., Ltd., Suwon, Rep. of Korea

[21] Appl. No.: 850,929

[22] Filed: May 2, 1997

[30] Foreign Application Priority Data

May 2, 1996 [KR] Rep. of Korea ............ 1996-14225

[51] Int. Cl.⁶ ................................................ H01J 29/06
[52] U.S. Cl. ............................ 315/8; 315/85; 315/370
[58] Field of Search .................... 315/8, 85, 368.11, 315/368.12, 368.25, 370

[56] References Cited

U.S. PATENT DOCUMENTS

| | | | |
|---|---|---|---|
| 4,899,082 | 2/1990 | Sands et al. ................................. | 315/8 |
| 4,950,955 | 8/1990 | Hoover et al. ............................... | 315/8 |
| 4,963,789 | 10/1990 | Buhler ......................................... | 315/8 |
| 5,179,315 | 1/1993 | Lonoce et al. ............................... | 315/8 |
| 5,223,768 | 6/1993 | Izawa et al. ............................. | 315/8 X |

Primary Examiner—Robert J. Pascal
Assistant Examiner—Justin P. Bettendorf
Attorney, Agent, or Firm—Robert E. Bushnell, Esq.

[57] ABSTRACT

An automatic image rotation compensation circuit includes: a terrestrial magnetic field detecting unit for detecting horizontal and vertical terrestrial magnetic fields of a place where a display device is installed; an amplifying unit for amplifying the horizontal and vertical terrestrial magnetic field values detected by the terrestrial magnetic field detecting unit; an analog-to-digital converting unit for converting the analog terrestrial magnetic field values amplified by the amplifying unit into digital signals; a memory for storing image compensation reference values corresponding to various terrestrial magnetic field values; a microcomputer for receiving the digital terrestrial magnetic field values from the analog-to-digital converting unit and reading compensation values corresponding to the terrestrial magnetic field values; a digital-to-analog converting unit for converting the digital signals from the microcomputer into analog signals; and a deflection controller for performing a differential amplification on the signals transmitted from the digital-to-analog converting unit and changing a current flowing through rotation coils to control a tilt.

11 Claims, 7 Drawing Sheets

AUTOMATIC IMAGE ROTATION COMPENSATION CIRCUIT AND METHOD

CLAIM OF PRIORITY

This application makes reference to, incorporates the same herein, and claims all benefits accruing under 35 U.S.C. §119 from applications for Automatic Image Rotation Compensation Circuit And Method earlier filed in the Korean Industrial Property Office on 2 May 1996, and there duly assigned Ser. No. 96-14225.

BACKGROUND OF THE INVENTION

1. Field of the Invention

The prevent invention relates to an image compensation circuit of a display device. Specifically, this invention is an automatic image rotation compensating for a tilt caused by a terrestrial magnetic field by supplying a predetermined current to coils wound on a cathode-ray tube.

2. Discussion of Related Art

A general display device, such as a cathode ray tube (CRT), has an electron gun forming an electron beam to scan on a screen. The electron beam is deflected over the screen in a horizontal scanning pattern. An image depends on a density of the electron beam. The electron beam is deflected by an electromagnetic field formed by deflecting coils, so the deflection degree of the electron beam can be changed when the electromagnetic field is influenced by an outer disturbance.

Figure 1:
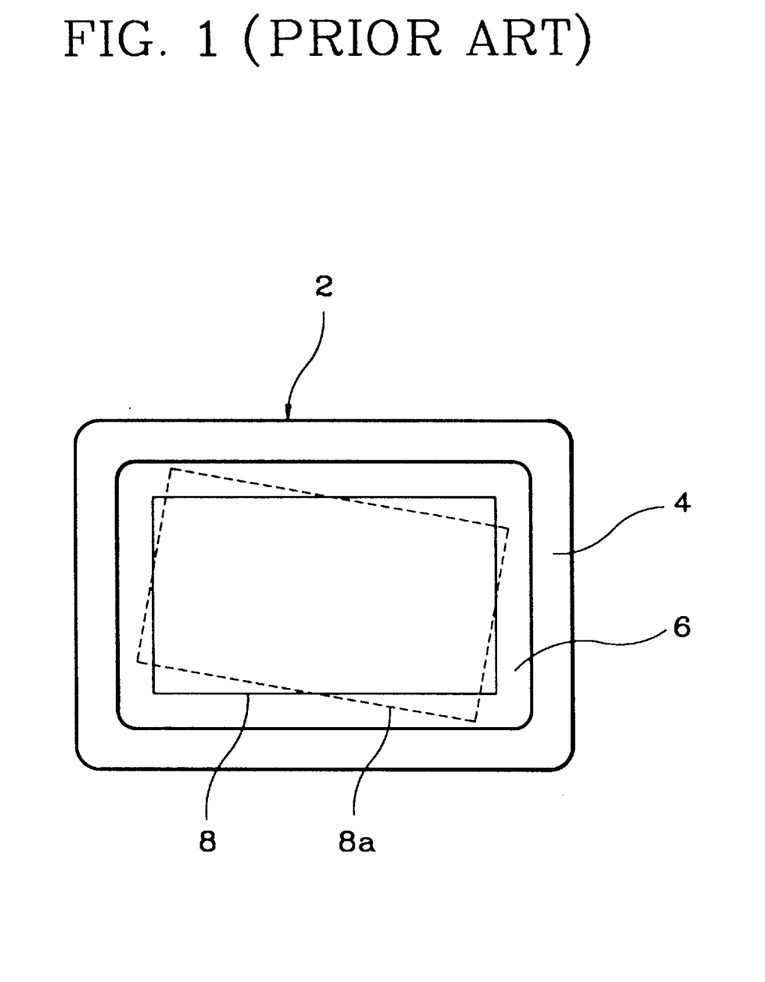
FIG. 1 illustrates the state of a rotated image influenced by a terrestrial magnetic field in a display device.

A CRT, however, is susceptible to an external magnetic field, known as terrestrial magnetism, which can cause a problem called "image rotation", wherein the displayed image appears to be rotated with respect to the horizontal axis of the display screen. This image rotation is caused by a change the terrestrial magnetism due to, for example, a change in the geographic location of the CRT. An external magnetic field can deflect the electron beam emitted from an electron gun of the CRT thus causing the image rotation. As shown in FIG. 1, a television set 6 is fixed in the chassis of display device 2. When a normal deflection is formed, normal image 8 is displayed in television set 6, while rotated image 8a is displayed when the display device is influenced by an external magnetic field.

U.S. Pat. No. 4,899,082 to Robert M. Sands, et al., entitled Apparatus Compensating For Image Rotation In A CRT Display discusses several known methods for correcting for image rotation including the use of a rotation coil, or conductive winding, which is wrapped around the CRT and a variable resistor, which must be changed by user manipulation, for changing the current through the rotation coil to compensate for image rotation. Another problem, besides requiring user interaction, is that the compensation value may be greater that the value allowed by the variable resistor.

SUMMARY OF THE INVENTION

Accordingly, the present invention is directed to an automatic image rotation compensation circuit that substantially obviates one or more of the limitations and disadvantages of the related art.

An object of the present invention is to provide an automatic image rotation compensation circuit for automatically compensating for a tilt caused by a terrestrial magnetic field. The circuit detects the terrestrial magnetic field using a terrestrial magnetic field detecting unit, which employs the principle of a compass, reads a compensation value corresponding to the detected terrestrial magnetic field from a memory, and produces a predetermined current.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, an automatic image rotation compensation circuit consists of: a terrestrial magnetic field detecting unit for detecting horizontal and vertical terrestrial magnetic fields of a place where a display device is installed; an amplifying unit for amplifying the horizontal and vertical terrestrial magnetic field values detected by the terrestrial magnetic field detecting unit; an analog-to-digital converting unit for converting the analog terrestrial magnetic field values amplified by the amplifying unit into digital signals; a memory for storing image compensation reference values corresponding to various terrestrial magnetic field values from the analog-to-digital converting unit and reading compensation values corresponding to the terrestrial magnetic field values; a digital-to-analog converting unit for converting the digital signals from the microcomputer into analog signals; and a deflection controller for performing a differential amplification on the signals transmitted from the digital-to-analog converting unit and changing a current flowing in rotation coils to control a tilt.

It is to be understood that both the foregoing general description and the following detailed description are exemplary and explanatory and intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention, and, together with the description, serve to explain the principles of the invention.

In the drawings.

DETAILED DESCRIPTION OF PREFERRED EMBODIMENT

The terrestrial magnetic field interferes the track of the electron beam, and changes its landing position, resulting in an image rotation as shown in FIG. 1.

Figure 2:
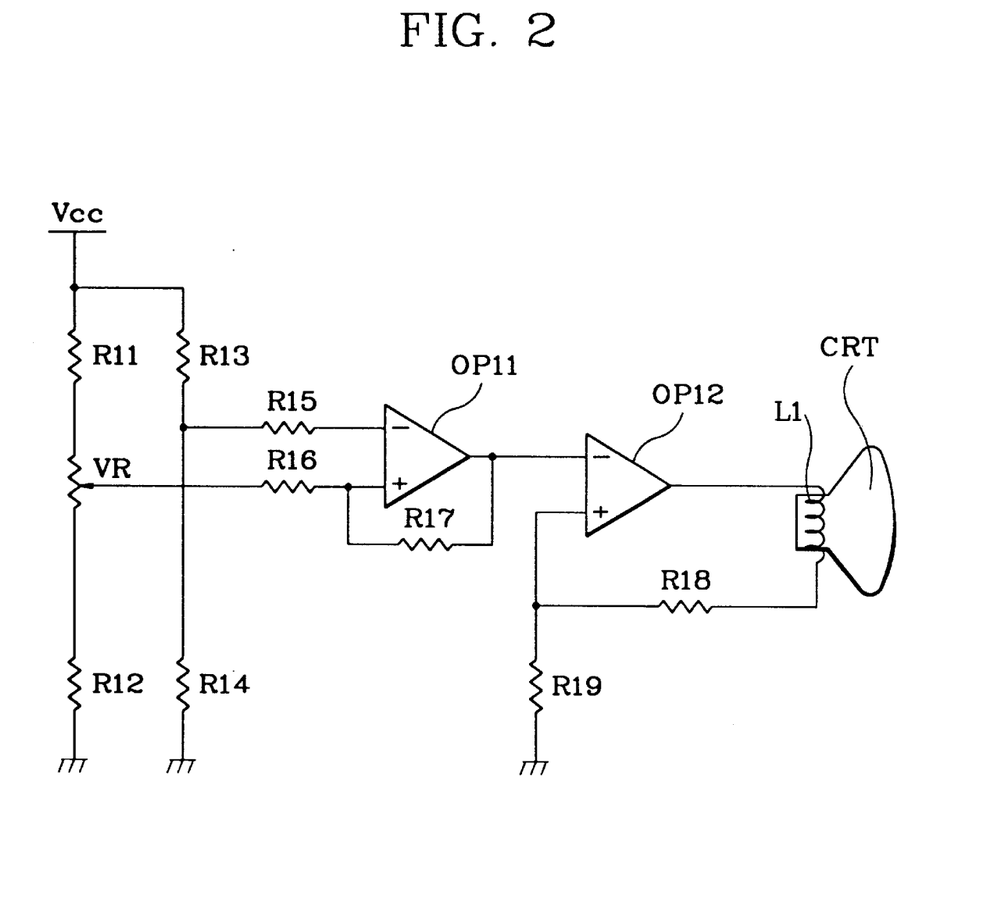
FIG. 2 is a circuit diagram of an exemplary image rotation compensation circuit.

FIG. 2 is a circuit diagram of an exemplary terrestrial magnetic field compensation circuit for compensating for an image rotation by the terrestrial magnetic field. The circuit includes a variable resistor VR for controlling a current applied to rotation coils L1 wound on a cathode-ray tube (CRT), an amplifier OP11, for generating a voltage proportional to the difference between a voltage divided by variable resistor VR, and resistors R11 and R12, and a reference voltage detected by resistors R13 and R14; and amplifier OP 11, for generating a voltage proportional to the difference between a voltage divided by the variable resistor VR, and resistors R11 and R12, and a reference voltage detected by resistors R13 and R14, and an amplifier OP12, for preventing an electron beam from being deflected by the terrestrial magnetic field by supplying the voltage applied by the amplifier OP11 to the coils L1.

The image rotation compensation circuit of FIG. 2 adjusts the output voltage of the amplifier OP11 according to the value of the variable resistor VR, with reference to the voltage produced by resistors R13 and R14, thereby changing the voltage output by the amplifier OP12 using the output voltage of the amplifier OP11. The circuit compensates for a tilt by a user changing the value of variable resistor VR to control the current flowing in rotation coils L1 to change the direction of an electron beam in CRT.

Figure 3:
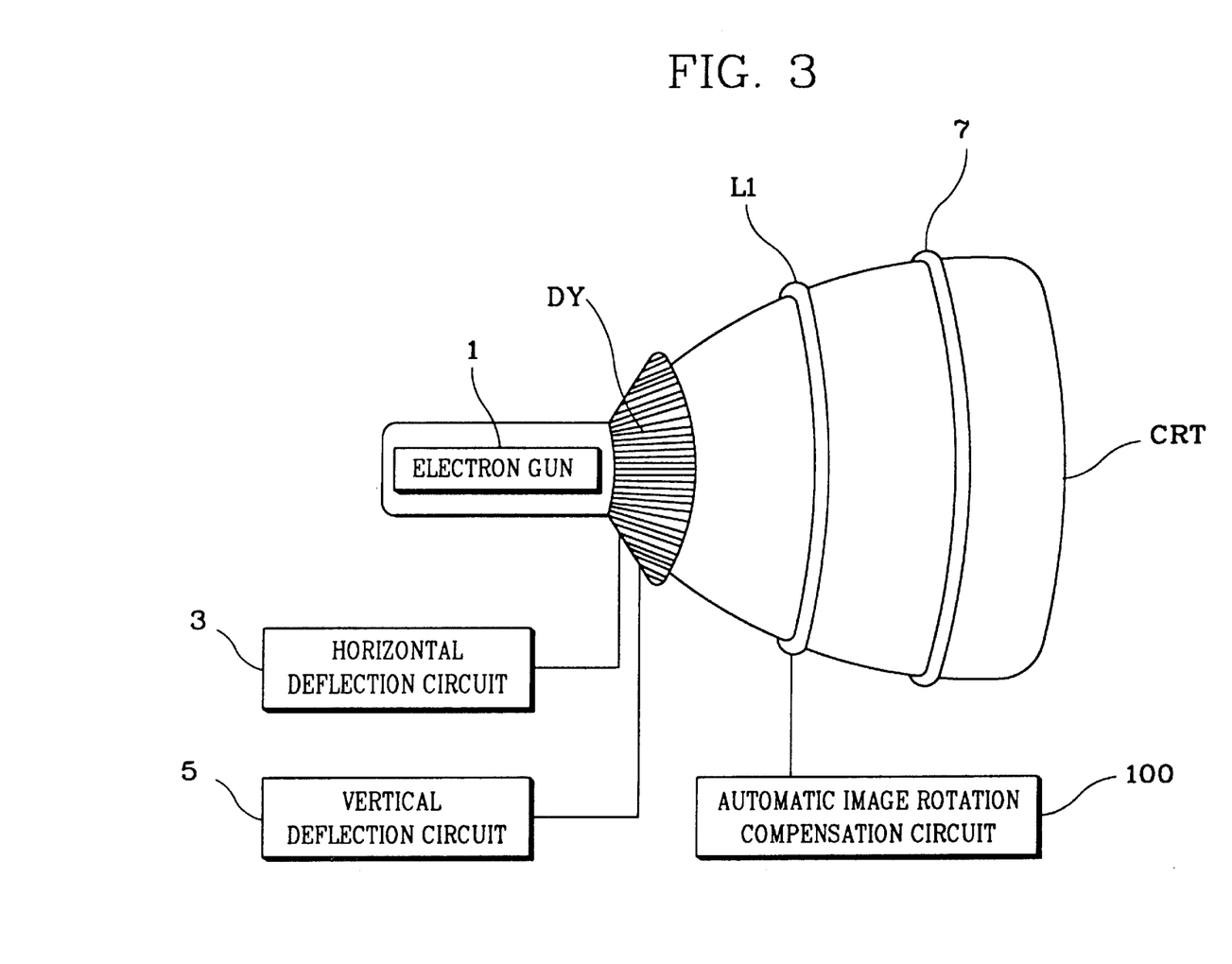
FIG. 3 shows a configuration of a display device including an automatic image rotation compensation circuit according to the principles of the present invention.

As shown in FIG. 3, a display device of the present invention utilizes an electron gun 1, for shooting an electron beam, a deflection yoke DY, for controlling a distance or strength of the electron beam shot out of electron gun 1 against a shadow-mask by forming a magnetic field using a current which flows through coils, horizontal and vertical deflection circuits 3 and 5, for controlling a current which flows through deflection yoke DY, rotation coils L1 for preventing a tilt of an electron beam caused by a terrestrial magnetic field, an automatic image rotation compensation circuit 100, for automatically controlling the current which flows through rotation coils L1 to compensate for tilt resulting from a terrestrial magnetic field, and degaussing coils 7, for removing spots in an image caused by the terrestrial magnetic field.

Figure 4:
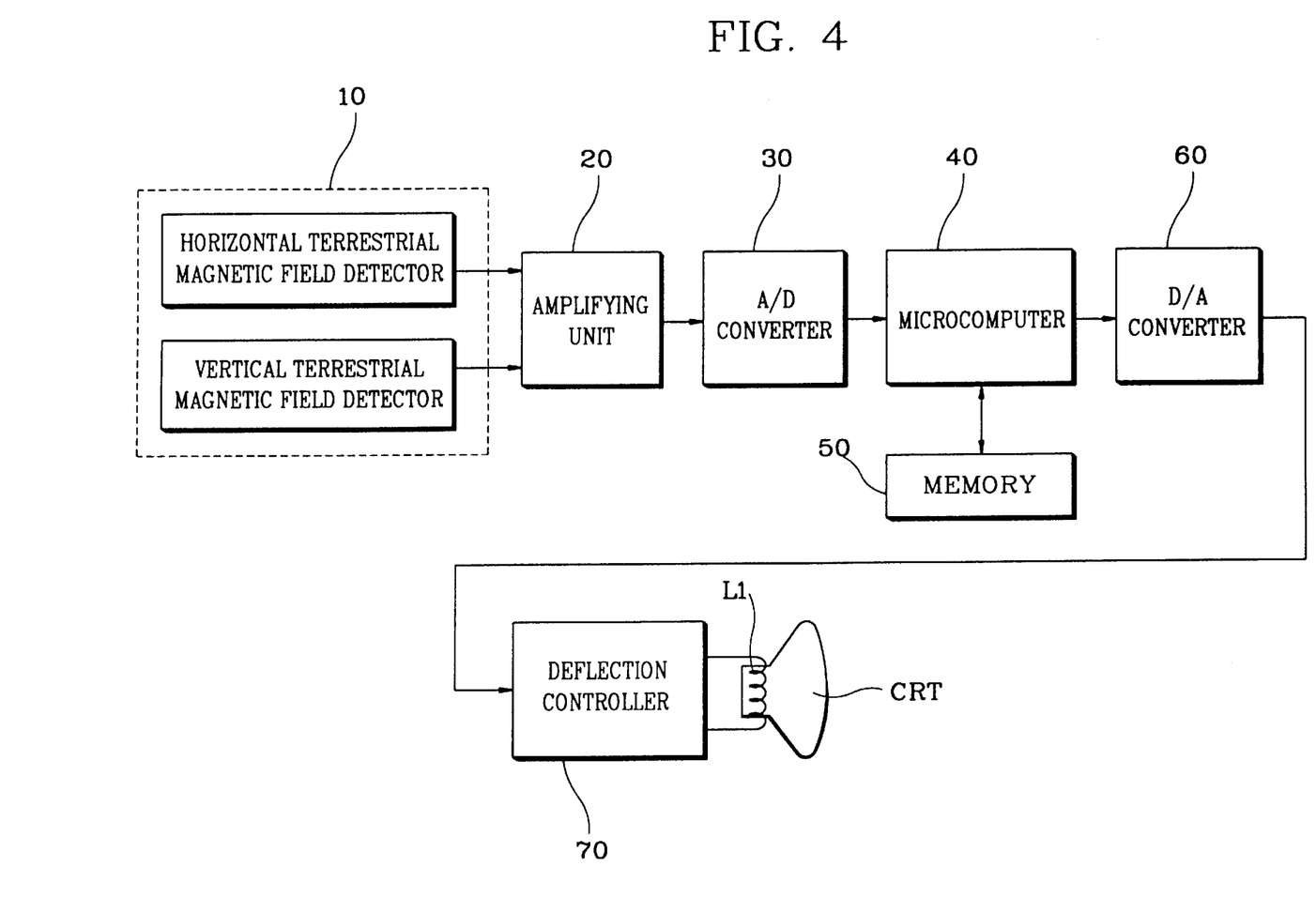
FIG. 4 is a block diagram of the automatic image rotation compensation circuit shown in FIG. 3.

As shown in FIG. 4, the automatic image rotation compensation circuit utilizes a terrestrial magnetic field detecting unit 10 for detecting horizontal and vertical terrestrial magnetic fields, an amplifying unit 20 for amplifying the detected terrestrial magnetic field values, an analog-to-digital (A/D) converter 30 for converting the amplifying analog signals into digital signals, a microcomputer 40 for comparing the value converted by A/D converter 30 with the data of a memory 50 to read a compensation reference value, a digital-to-analog (D/A) converter 60 for converting the signals transmitted from microcomputer 40 into analog signals, and a deflection controller 70 for amplifying the low band signals generated by D/A converter 60 to control the current of the rotation coils L1 in a CRT.

Figure 5:
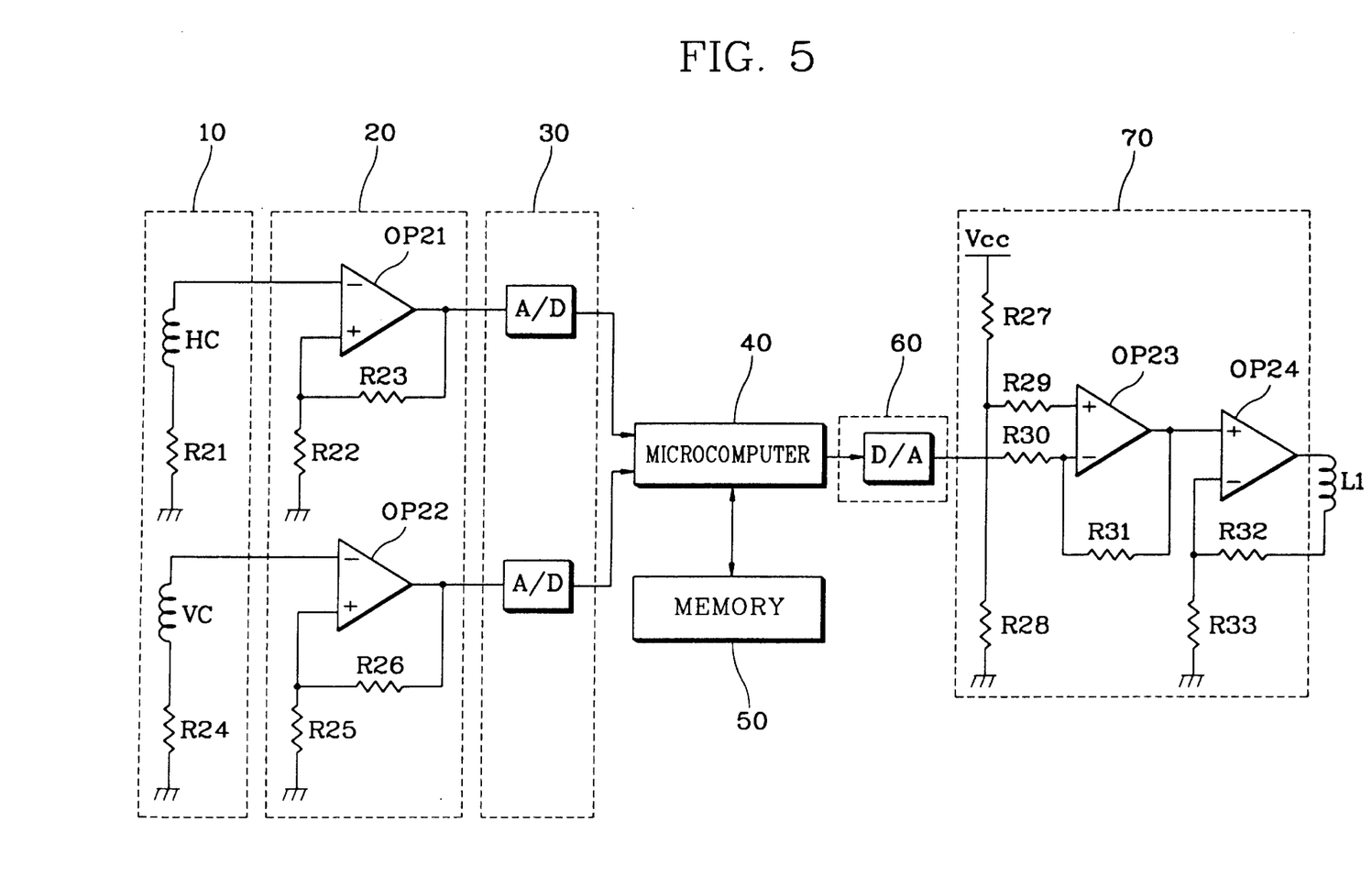
FIG. 5 is a circuit diagram of the automatic image rotation compensation circuit of FIG. 4.

As shown in FIG. 5, terrestrial magnetic field detecting unit 10 consists of terrestrial magnetic field detection coils HC and VC, and resistors R21 and R24 which are serially connected to the coils, respectively. The terrestrial magnetic field detection coils HC and VC detect horizontal and vertical terrestrial magnetic fields particular to the present location of the CRT, and generate signals corresponding to the values detected. Amplifying unit 20 consists of amplifiers OP21 and OP22 each having a first input terminal respectively connected to terrestrial magnetic field detection coils HC and VC, resistors R23 and R26 respectively connected between a second input terminal and the output terminals of amplifiers OP21 and OP22, and resistors R22 and R25 respectively connected between ground and the second input terminals of amplifiers OP21 and OP22.

Analog-to-digital converting unit 30 consists of two A/D convertors respectively connected to the output terminals of amplifiers OP21 and OP22 for converting analog signals which are detected by terrestrial magnetic field detecting unit 10 and then amplified by amplifiers OP21 and OP 22, into digital signals. Microcomputer 40 receives the digital signals generated by A/D converting unit 30 and reads the terrestrial magnetic field of a particular area corresponding to the received data from memory 50. Memory 50 stores reference image compensation values corresponding to different terrestrial magnetic field values. Digital-to-analog converting unit 60 includes D/A converter for converting the terrestrial magnetic field data transmitted by microcomputer 40 into analog data. Deflection controller 70 consists of amplifiers OP23 and OP24. Amplifier OP23 generates a voltage proportional to the difference between the voltage applied by D/A converting unit 60 through resistor R30 and the reference voltage Vcc divided by resistors R27, R28, and R29. The proportional voltage is fed back, via resistor R31, to the input of OP23 connected to R30, and is further supplied to one input of amplifier OP24. Amplifier OP24 applies the voltage from the amplifier OP23 to rotation coils L1 and then amplifies a feedback current transmitted from rotation coils L1 through resistor R32. A resistor R33 is connected between rotation coils L1 and ground.

Figure 6:
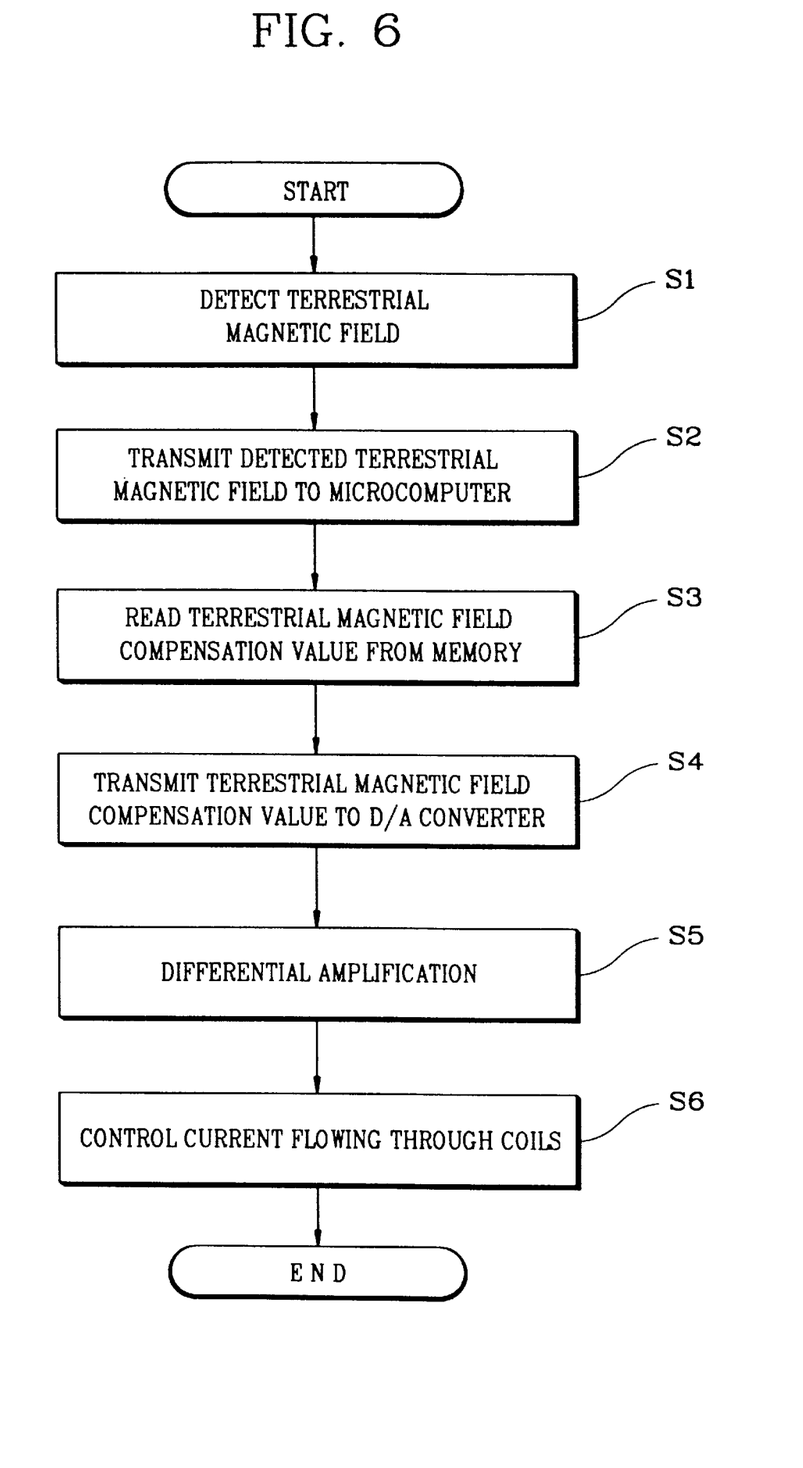
FIGS. 6 and 7 are flow charts of an automatic image rotation compensation method according to the principles of the present invention.

The operation of the present invention is described below with reference to FIG. 6.

When a display device equipped with the automatic image rotation compensation circuit of the present invention is turned on, terrestrial magnetic field detecting unit 10 detects horizontal and vertical terrestrial magnetic fields of the place where the display device is installed, using terrestrial magnetic fields detecting coils HC and VC, and resistors R21 and R24, and then applies horizontal and vertical terrestrial magnetic fields to amplifiers OP21 and OP22 in amplifying unit 20.

The amplifiers OP21 and OP 22 amplify signals corresponding to horizontal and vertical terrestrial magnetic fields to predetermined levels using feedback resistors R22, R23, R25 and R26. The amplified signals are converted into digital signals by A/D converting unit 30 (step S1). Data generated by A/D converting unit 30 is transmitted to microcomputer 40 which controls the overall system (step S2). Microcomputer 40 reads terrestrial magnetic field compensation values corresponding to the data received from memory 50 (step S3). This step of reading the compensation values progresses the procedure shown in FIG. 7.

Figure 7:
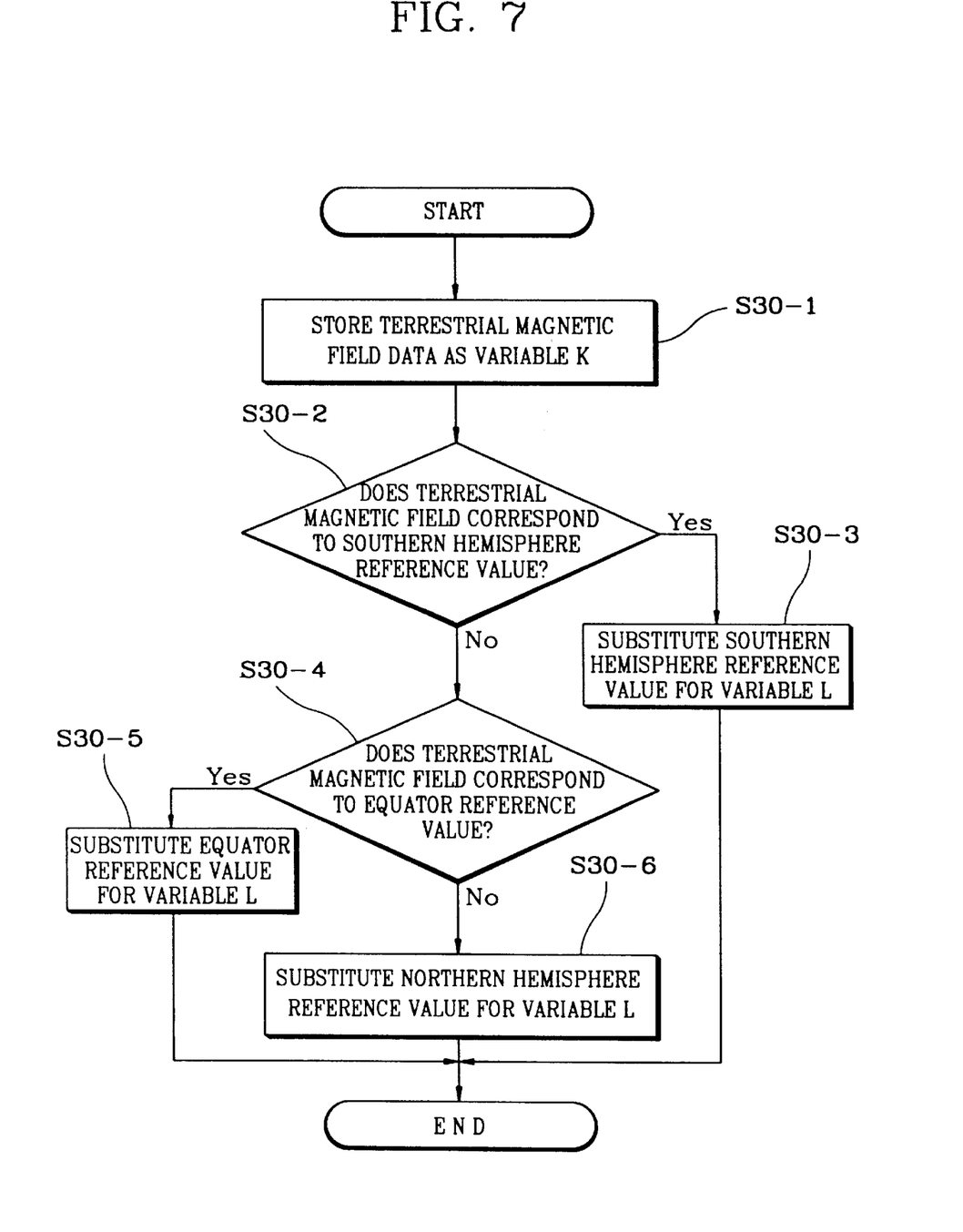

As shown in FIG. 7, the terrestrial magnetic field data from the A/D converters are combined into a digital word of a predetermined number of bits, e.g., 4 bits, and stored as an arbitrary variable K (step S3-1). Microcomputer 40 checks if the terrestrial magnetic field data corresponding to the range of a reference values of the Southern Hemisphere (step S3-2). When the data corresponds to the range of the Southern Hemisphere reference values (A1–A2), that is, A1<K<A2, microcomputer 40 substitutes the South Hemisphere reference value (SR1) for a terrestrial magnetic field compensation variable L, that is, L=SR1, as a Southern Hemisphere reference terrestrial magnetic field compensation values (step S2-3).

If the terrestrial magnetic field data does not correspond to the range of the reference value of the Southern Hemisphere, microcomputer 40 checks if the data corresponds to an equator reference value (step S3-4). When the data corresponds to the range of the equator reference values (B1–B2), that is, B1<K<B2, the equator reference value (SR2) is designated as the terrestrial magnetic field compensation value, that is, L=SR2 (step S3-5).

If the data does not corresponds to the range of the equator reference values, a Northern Hemisphere reference value (SR3) is selected as the terrestrial magnetic field compensation value, that is, L=SR3 (step S3-6).

Microcomputer 40 sends the terrestrial magnetic field compensation value which it read from memory 50, according to the above steps S3-1 to S3-6, to D/A converting unit 60. The terrestrial magnetic field compensation value is converted into an analog signal by D/A converting unit 60 (step S4 in FIG. 6). The analog signal is transmitted to differential amplifier OP23 through resistor R30 in deflection controller 70 (step S5). The divided reference voltage is applied to the other input terminal of amplifier OP23 from resistor R29. Amplifier OP24 applies the voltage from the differential amplifier OP23 to the rotation coils L1 and amplifies the feedback voltage transmitted from the rotation coils L1 through resistor R32 to reapply to the rotation coils L1. Consequently, the compensation value obtained using the detected terrestrial magnetic field value controls the current at rotation coils L1 to automatically compensate for a tilt caused by the terrestrial magnetic field (step S6).

As described above, the present invention detects a terrestrial magnetic field of the place where a display device is installed, reads a compensation value corresponding to the detected terrestrial magnetic field from memory using a microcomputer, and controls the current at rotation coils using the compensation value, resulting automatically preventing an electron beam form tilting.

It will be apparent to those skilled in the art that various modifications and variations can be made in an automatic image rotation compensation circuit and method of the present invention without deviating from the spirit or scope of the invention. Thus, it is intended that the present invention cover the modifications and variations of this invention provided they come within the scope of the appended claims and their equivalents.

What is claimed is:

1. An automatic image rotation compensation circuit, comprising:
    a terrestrial magnetic field detector for generating horizontal and vertical terrestrial magnetic field values by detecting horizontal and vertical terrestrial magnetic fields of a location where a display device is installed;
    an amplifier for producing amplified field values by amplifying said horizontal and vertical terrestrial magnetic field values;
    an analog-to-digital converter for converting the amplified field values into digital signals;
    a memory for storing a plurality of magnetic field values and a plurality of terrestrial magnetic field reference values corresponding to said plurality magnetic field values;
    a microcomputer for comparing said digital values to said plurality of magnetic field values and, based on a comparison result, selecting for output as a terrestrial magnetic field compensation value one of said terrestrial magnetic field reference values;
    a digital-to-analog converting unit for converting said terrestrial magnetic field compensation value from said microcomputer into an analog signal;
    a deflection controller for generating a control voltage by differentially amplifying said analog signal; and
    a rotation coil wrapped around a portion of said display device responsive to said control voltage for generating a compensating current to cancel said horizontal and vertical terrestrial magnetic fields, wherein said deflection controller comprises:
        first and second resistors connected in series between a voltage source and a ground terminal;
        a first operational amplifier having one input terminal connected to receive said analog signal via a third resistor;
        a fourth resistor commonly connected to said first and second resistors for providing a reference voltage to another input terminal of said first operational amplifier;
        a fifth resistor connected between said one input terminal and an output terminal of said first operational amplifier;
        a second operational amplifier having a first input terminal connected to said output terminal of said first operational amplifier, an output terminal connected to a first end of said rotation coil, and a second input terminal connected to a second end of said rotation coil via a sixth resistor; and
        a seventh resistor connected between said second end of said rotation coil and said ground terminal.

2. The circuit according to claim 1, wherein said terrestrial magnetic field detector comprises:
    a first resistor having a first end connected to a ground terminal and a second end connected to a first end of a first coil, wherein a second end of said first coil is connected to provide said horizontal terrestrial magnetic field to a first input terminal of said amplifier; and
    a second resistor having a first end connected to said ground terminal and a second end connected to a first end of a second coil, wherein a second end of said second coil is connected to provide said vertical terrestrial magnetic field to a second input terminal of said amplifier.

3. The circuit according to claim 1, wherein said terrestrial magnetic field detector comprises a plurality of terrestrial magnetic field detection coils.

4. The circuit according to claim 1, wherein said amplifier comprises:
    a first operational amplifier having a first input terminal connected to receive said horizontal terrestrial magnetic field generated by said terrestrial magnetic field detector, a second input terminal connected to a ground terminal via a first resistor and an output terminal connected to said second input terminal via a second resistor; and
    a second operational amplifier having one input terminal connected to receive said vertical terrestrial magnetic field generated by said terrestrial magnetic field detector, another input terminal connected to said ground terminal via a third resistor and an output terminal connected to said another input terminal via a fourth resistor.

5. The circuit according to claim 4, wherein said analog-to-digital convertor comprises:
    a first analog-to-digital converter connected to said output terminal of said first operational amplifier; and
    a second analog-to-digital converter connected to said output terminal of said second operational amplifier.

6. The circuit according to claim 1, wherein said microcomputer combines said digital values into a digital word of a predetermined number of bits and stores said predetermined word as an arbitrary variable and compares said arbitrary variable to said plurality of magnetic field values.

7. The circuit according to claim 1, wherein said plurality of terrestrial magnetic field reference values stored in said memory respectively correspond to a Southern hemispheric terrestrial magnetic field reference value, a Northern hemispheric terrestrial magnetic field reference value and a equatorial terrestrial magnetic field reference value.

8. An automatic image rotation compensation method for a display device, said method comprising the steps of:

generating a detected terrestrial magnetic field value by detecting a terrestrial magnetic field corresponding to a present location of said display device;

generating a terrestrial magnetic field compensation value by comparing said detected terrestrial magnetic field value to a plurality of stored values;

amplifying said terrestrial magnetic field value compensation value to produce a compensation voltage; and applying said compensation voltage to rotation coils wrapped around a portion of said display device to generate a compensating current to cancel said terrestrial magnetic field, wherein said step of generating a terrestrial magnetic field compensation value comprises:

storing said detected terrestrial magnetic field value as a first variable;

comparing said first variable to a plurality of values stored in a memory;

reading out from said memory a terrestrial magnetic field reference value based on a result of said comparing step;

storing said terrestrial magnetic field reference value as a second variable; and outputting said second variable as said terrestrial magnetic field compensation value.

9. The method according to claim 8, wherein said step of amplifying comprises:

converting said terrestrial magnetic field compensation value into an analog signal;

producing a differentially amplified signal by comparing said analog signal to a reference voltage in a differential amplifier; and amplifying the differentially amplified signal to produce said compensation voltage.

10. An automatic image rotation compensation method for a display device, said method comprising the steps of:

generating a detected terrestrial magnetic field value by detecting a terrestrial magnetic field corresponding to a present location of said display device;

generating a terrestrial magnetic field compensation value by comparing said detected terrestrial magnetic field value to a plurality of stored values;

amplifying said terrestrial magnetic field value compensation value to produce a compensation voltage; and applying said compensation voltage to rotation coils wrapped around a portion of said display device to generate a compensating current to cancel said terrestrial magnetic field;

said step of generating a detected terrestrial magnetic field value comprises:

generating horizontal and vertical terrestrial magnetic field values by detecting horizontal and vertical terrestrial magnetic fields corresponding to said present location;

producing amplified field values by amplifying said horizontal and vertical terrestrial magnetic field values;

converting the amplified field values into digital signals; and combining said digital signals to produce said detected terrestrial magnetic field value; and said step of generating a terrestrial magnetic field compensation value comprises:

storing said detected terrestrial magnetic field value as a first variable;

comparing said first variable to a plurality of values stored in a memory;

reading out from said memory a terrestrial magnetic field reference value based on a result of said comparing step;

storing said terrestrial magnetic field reference value as a second variable; and outputting said second variable as said terrestrial magnetic field compensation value.

11. The method according to claim 10, wherein said step of amplifying comprises:

converting said terrestrial magnetic field compensation value into an analog signal;

producing a differentially amplified signal by comparing said analog signal to a reference voltage in a differential amplifier; and amplifying the differentially amplified signal to produce said compensation voltage.

* * * * *